US012585064B2

(12) United States Patent
Giewont et al.

(10) Patent No.: US 12,585,064 B2
(45) Date of Patent: Mar. 24, 2026

(54) PHOTONICS CHIPS WITH AN INTEGRATED SEMICONDUCTOR LASER

(71) Applicant: GlobalFoundries U.S. Inc., Malta, NY (US)

(72) Inventors: Kenneth J. Giewont, Hopewell Junction, NY (US); Theodore Letavic, Putnam Valley, NY (US); Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 294 days.

(21) Appl. No.: 18/501,285

(22) Filed: Nov. 3, 2023

(65) Prior Publication Data

US 2025/0147234 A1     May 8, 2025

(51) Int. Cl.

| | |
|---|---|
| *G02B 6/12* | (2006.01) |
| *G02B 6/122* | (2006.01) |
| *G02B 6/13* | (2006.01) |
| *G02B 6/14* | (2006.01) |

(52) U.S. Cl.
CPC ............. *G02B 6/1228* (2013.01); *G02B 6/13* (2013.01); *G02B 2006/12121* (2013.01)

(58) Field of Classification Search
CPC ................................. G02B 6/1228; G02B 6/14
See application file for complete search history.

(56) References Cited

U.S. PATENT DOCUMENTS

| | | | | |
|---|---|---|---|---|
| 8,213,751 | B1 * | 7/2012 | Ho | G02F 1/035 |
| | | | | 385/11 |
| 10,684,414 | B1 * | 6/2020 | Woods | G02B 6/2813 |
| 2012/0230635 | A1 * | 9/2012 | Yoshida | G02B 6/125 |
| | | | | 385/43 |
| 2016/0252692 | A1 * | 9/2016 | Hofrichter | G01J 1/44 |
| | | | | 250/227.11 |
| 2016/0327759 | A1 * | 11/2016 | Keyvaninia | H01S 5/0218 |
| 2019/0137688 | A1 * | 5/2019 | Lin | G02B 6/1228 |
| 2025/0110275 | A1 * | 4/2025 | Huang | G02B 6/13 |

FOREIGN PATENT DOCUMENTS

| | | | | |
|---|---|---|---|---|
| EP | 2544319 B1 * | 3/2015 | | H01S 5/1032 |

OTHER PUBLICATIONS

G. -H. Duan et al., "Hybrid III—V on Silicon Lasers for Photonic Integrated Circuits on Silicon," in IEEE Journal of Selected Topics in Quantum Electronics, vol. 20, No. 4, pp. 158-170, Jul.-Aug. 2014, Art No. 6100213, doi: 10.1109/JSTQE.2013.2296752.

(Continued)

*Primary Examiner* — Charlie Y Peng
(74) *Attorney, Agent, or Firm* — Thompson Hine LLP; Anthony Canale

(57) ABSTRACT

Structures for a photonics chip that include an integrated semiconductor laser and methods of forming such structures. The structure comprises a waveguide core, a multi-layer quantum-well stack, and an optical coupler on a portion of the waveguide core. The optical coupler, which comprises a semiconductor material, is disposed between the portion of the waveguide core and the multi-layer quantum-well stack.

20 Claims, 7 Drawing Sheets

(56) References Cited

OTHER PUBLICATIONS

Alexander W. Fang, Hyundai Park, Oded Cohen, Richard Jones, Mario J. Paniccia, and John E. Bowers, "Electrically pumped hybrid AlGaInAs-silicon evanescent laser," Optics Express 14, 9203-9210 (2006).

Hyundai Park, Alexander W. Fang, Satoshi Kodama, and John E. Bowers, "Hybrid silicon evanescent laser fabricated with a silicon waveguide and III-V offset quantum wells," Optics Express 13, 9460-9464 (2005).

Guo, Xuhan & He, An & Su, Yikai. (2019). "Recent advances of heterogeneously integrated III-V laser on Si." Journal of Semiconductors. 40. 101304. 10.1088/1674-4926/40/10/101304.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "3D Integrated Laser Attach Technology on a 300-mm Monolithic CMOS Silicon Photonics Platform," in IEEE Journal of Selected Topics in Quantum Electronics, vol. 29, No. 3: Photon. Elec. Co-Inte. and Adv. Trans. Print., pp. 1-19, May-Jun. 2023, Art No. 8200519, doi: 10.1109/JSTQE.2023.3238290.

Bian, Yusheng, "Structures for an Optical Coupler and Related Methods" filed on Aug. 22, 2022 as a U.S. Appl. No. 17/892,584.

* cited by examiner

PHOTONICS CHIPS WITH AN INTEGRATED SEMICONDUCTOR LASER

BACKGROUND

The disclosure relates to photonics chips and, more specifically, to structures for a photonic chip that include an integrated semiconductor laser and methods of forming such structures.

Photonics chips are used in many applications and systems including, but not limited to, data communication systems and data computation systems. A photonics chip includes a photonic integrated circuit comprised of photonic components, such as modulators, polarizers, and optical couplers, that are used to manipulate light received from a light source.

A laser chip may function as the light source for the photonics chip. For example, a laser chip may be separately manufactured as a flip chip and attached inside a cavity that is formed in a substrate of the photonics chip. The laser chip includes a semiconductor laser that may be configured to emit coherent light at an infrared wavelength. Light emitted by the semiconductor laser may be supplied to an edge coupler, which is coupled to the photonic integrated circuit.

Improved structures for a photonic chip that include an integrated semiconductor laser and methods of forming such structures are needed.

SUMMARY

In an embodiment of the invention, a structure comprises a waveguide core, a multi-layer quantum-well stack, and an optical coupler on a portion of the waveguide core. The optical coupler, which comprises a semiconductor material, is disposed between the portion of the waveguide core and the multi-layer quantum-well stack.

In an embodiment of the invention, a method comprises forming a waveguide core, forming a multi-layer quantum-well stack, and forming an optical coupler on a portion of the waveguide core. The optical coupler, which comprises a semiconductor material, is disposed between the portion of the waveguide core and the multi-layer quantum-well stack.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figures 1, 1A:
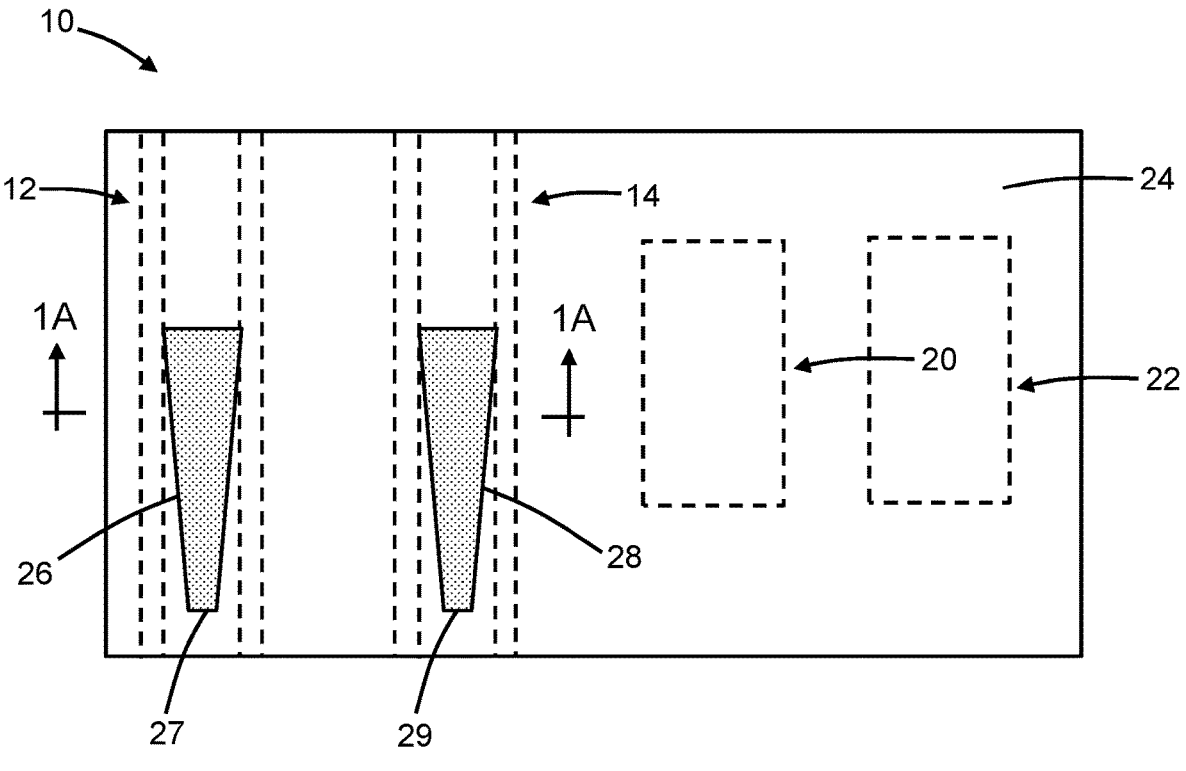
FIG. 1 is a top view of a structure at an initial fabrication stage of a processing method in accordance with embodiments of the invention.
FIG. 1A is a cross-sectional view taken generally along line 1A-1A in FIG. 1.

With reference to FIGS. 1, 1A and in accordance with embodiments of the invention, a photonics structure 10 includes a waveguide core 12 and a waveguide core 14 that are disposed on, and over, a dielectric layer 16 and a substrate 18. In an embodiment, the dielectric layer 16 may be comprised of a dielectric material, such as silicon dioxide, and the substrate 18 may be comprised of a semiconductor material, such as single-crystal silicon. In an embodiment, the dielectric layer 16 may be a buried oxide layer of a silicon-on-insulator substrate. The waveguide cores 12, 14 are separated from the substrate 18 by the dielectric material of the intervening dielectric layer 16, which acts as low-index cladding. In an alternative embodiment, one or more additional dielectric layers comprised of, for example, silicon dioxide may be disposed between the waveguide cores 12, 14 and the upper surface of the dielectric layer 16.

In an embodiment, the waveguide cores 12, 14 may be comprised of a material having a refractive index that is greater than the refractive index of silicon dioxide. In an embodiment, the waveguide cores 12, 14 may be comprised of a semiconductor material, such as single-crystal silicon, amorphous silicon, or polysilicon. In an embodiment, the waveguide cores 12, 14 may be formed by patterning a layer with lithography and etching processes. In an embodiment, the waveguide cores 12, 14 may be formed by patterning the semiconductor material, such as single-crystal silicon, of the device layer of a silicon-on-insulator substrate. In an embodiment, the waveguide cores 12, 14 may be formed by patterning a deposited layer comprised of their constituent material, such as amorphous silicon.

The photonics structure 10 may include a photonic integrated circuit 20 and an electronic integrated circuit 22 that may be formed on different portions of the substrate 18 adjacent to the waveguide cores 12, 14. The photonic integrated circuit 20 includes photonic components that are configured to manipulate light received from a light source, such as a laser. Passive photonic components, such waveguides, tapers, bends, splitters, couplers, polarization management devices, edge couplers, and grating couplers, may be included in the photonic integrated circuit 20. Active photonic components, such Mach-Zehnder interferometer modulators, ring modulators, thermal phase shifters, and photodetectors, may also be included in the photonic integrated circuit 20. The electronic integrated circuit 22 includes electronic components, such as transistors, inductors, capacitors, resistors, transistors, and electronic fuses. In an embodiment, the electronic integrated circuit 22 may be a logic circuit. In an embodiment, the electronic integrated circuit 22 may be a radiofrequency circuit.

In an embodiment, the waveguide cores 12, 14 may be rib waveguide cores that include a central portion and thinner peripheral portions that project outwardly from the central portion. In an alternative embodiment, the waveguide cores 12, 14 may be ridge waveguide that lack the thinner peripheral portions. The waveguide cores 12, 14 may be routed on the substrate 18 to be connected to the photonic integrated circuit 20.

A dielectric layer 23 may be formed that fills the space around the waveguide cores 12, 14. The dielectric layer 23 may be comprised of a dielectric material, such as silicon dioxide, having a refractive index that is less than the refractive index of the semiconductor material constituting the waveguide cores 12, 14. The dielectric layer 23 may be formed by deposition and planarization. One or more dielectric layers 24 may be formed over the waveguide cores 12, 14, photonic integrated circuit 20, and electronic integrated circuit 22. Each dielectric layer 24 may be comprised of a dielectric material, such as silicon dioxide or silicon nitride.

Trenches 26, 28 may be patterned in the one or more dielectric layers 24 by lithography and etching processes. The trench 26 penetrates fully through the one or more dielectric layers 24 to a portion of the waveguide core 12. The trench 28 penetrates fully through the one or more dielectric layers 24 to a portion of the waveguide core 14. In an embodiment, the trench 26 may be lengthwise tapered with a width that increases with increasing distance from a narrowest width at a terminating end 27, and the trench 28 may be lengthwise tapered with a width that increases with increasing distance from a narrowest width at a terminating end 29.

Figures 2, 2A:
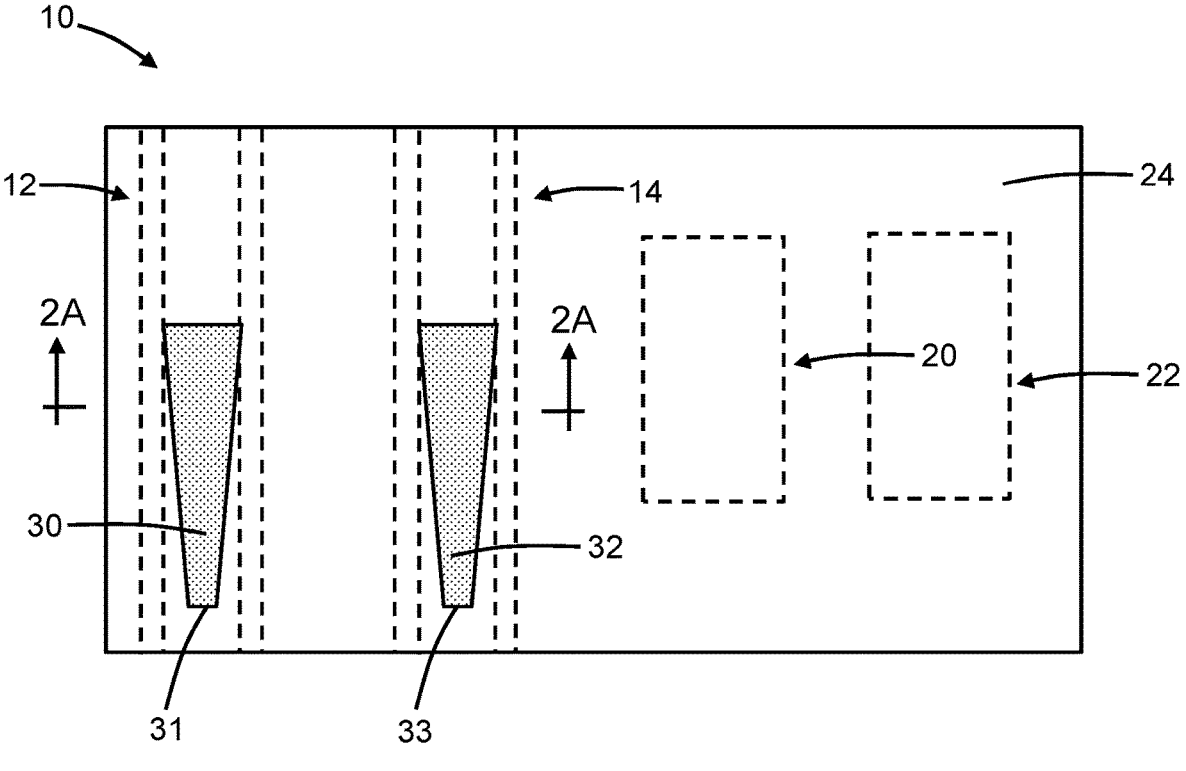
FIG. 2 is a top view of the structure at a fabrication stage of the processing method subsequent to FIG. 1.
FIG. 2A is a cross-sectional view taken generally along line 2A-2A in FIG. 2.

With reference to FIGS. 2, 2A in which like reference numerals refer to like features in FIGS. 1, 1A and at a subsequent fabrication stage, an optical coupler 30 may be formed inside the trench 26 and an optical coupler 32 may be formed inside the trench 28. In an embodiment, the optical couplers 30, 32 may be comprised of a single-crystal semiconductor material, such as single-crystal silicon, that is formed inside the trenches 26, 28 by a selective epitaxial growth process from the waveguide cores 12, 14 and planarized such that residual portions of the deposited single crystal semiconductor material inside the trenches 26, 28 define the optical couplers 30, 32. In an alternative embodiment, the optical couplers 30, 32 may be comprised of a non-single crystal semiconductor material, such as amorphous silicon, that is deposited and planarized such that residual portions of the deposited non-single crystal semiconductor material inside the trenches 26, 28 define the optical couplers 30, 32. In an embodiment, the optical couplers 30, 32 may have a thickness in a range of 320 nanometers to 350 nanometers. In an embodiment, the optical coupler 30 may be longitudinally aligned parallel to the optical coupler 32.

The shape of the optical couplers 30, 32 may be determined by the shape of the trenches 26, 28 (FIG. 1). In an embodiment, the optical coupler 30 may be lengthwise tapered with a width dimension that increases with increasing distance from a narrowest width at a terminating end 31, and the optical coupler 32 may be lengthwise tapered with a width dimension that increases with increasing distance from a narrowest width at a terminating end 33. In an embodiment, the optical coupler 30 and the optical coupler 32 may have identical shapes. In an embodiment, the width dimension of the optical coupler 30 and the width dimension of the optical coupler 32 may linearly increase with increasing distance from the respective terminating ends 31, 33. In an alternative embodiment, the width dimension of the optical coupler 30 and the width dimension of the optical coupler 32 may change based on a non-linear function, such as a quadratic function, a cubic function, a parabolic function, a sine function, a cosine function, a Bezier function, or an exponential function.

In an embodiment, the optical couplers 30, 32 may have a uniform taper angle. In an alternative embodiment, the optical couplers 30, 32 may taper in multiple stages each having a different taper angle. In alternative embodiments, one or both of the optical couplers 30, 32 may have a different configuration than the representative solid inverse taper, such as a metamaterial inverse taper or a taper based on inverse design determined by an iterative optimization algorithm.

Figure 3:
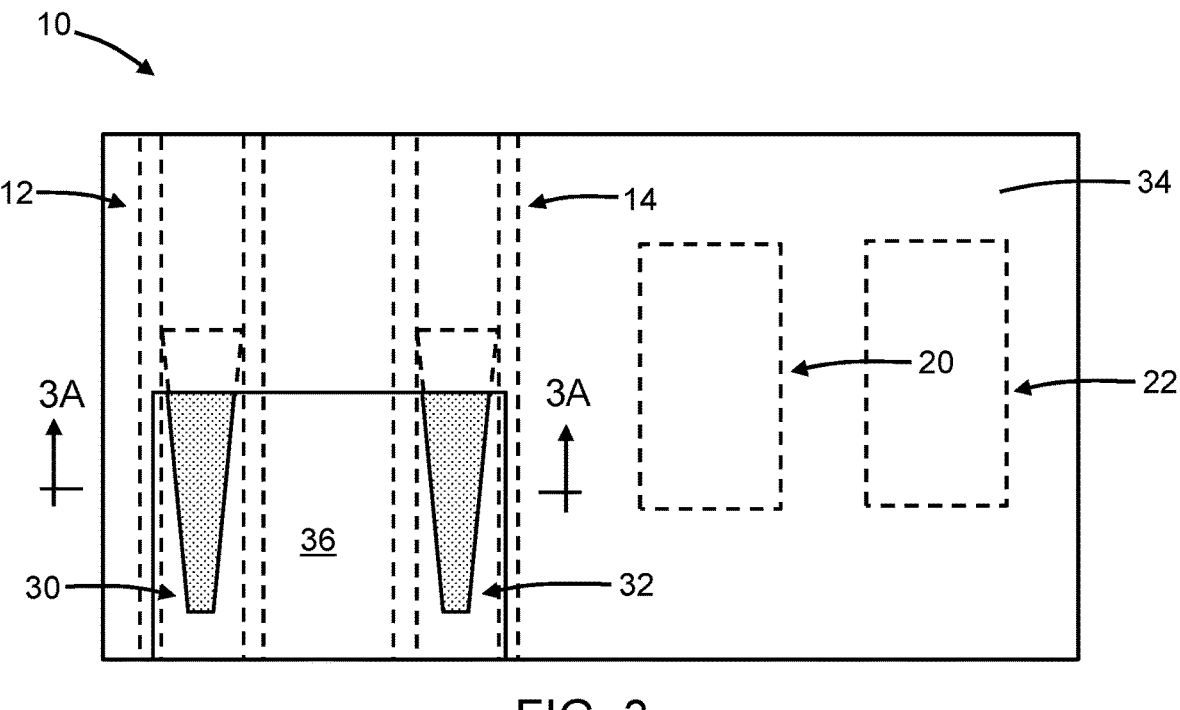
FIG. 3 is a top view of the structure at a fabrication stage of the processing method subsequent to FIG. 2.
Figure 3A:
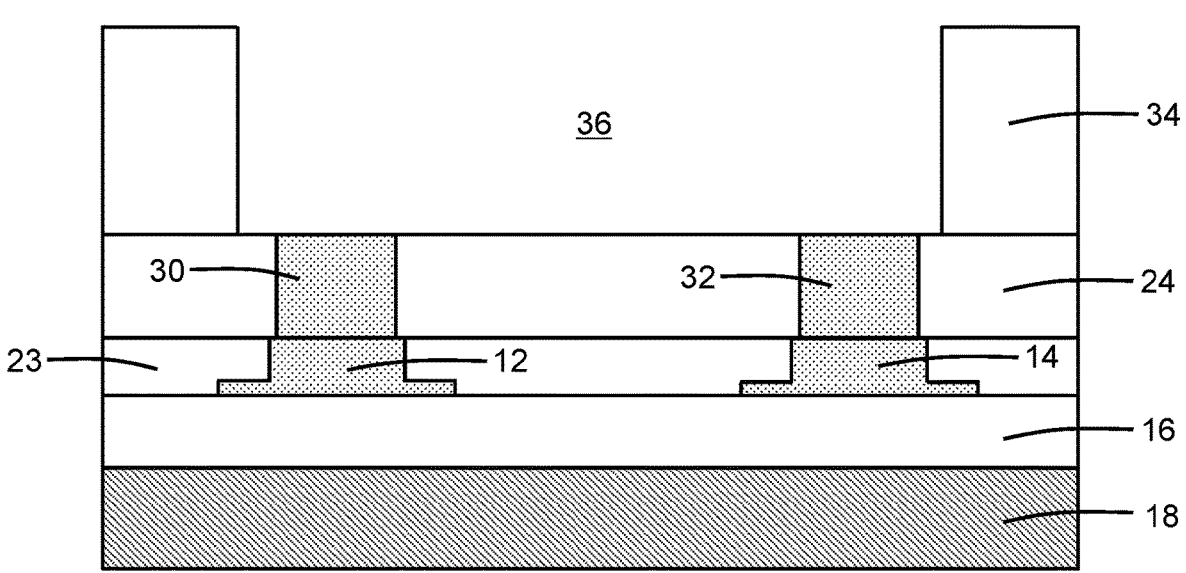
FIG. 3A is a cross-sectional view taken generally along line 3A-3A in FIG. 3.

With reference to FIGS. 3, 3A in which like reference numerals refer to like features in FIGS. 2, 2A and at a subsequent fabrication stage, a portion of a back-end-of-line stack 34 may be formed on the substrate 18 and over the photonic integrated circuit 20, the electronic integrated circuit 22, and the optical couplers 30, 32. The back-end-of-line stack 34 may have dielectric layers and interconnects in the dielectric layers that are coupled to the electrically-active photonic components of the photonic integrated circuit 20 and coupled to the electronic components of the electronic integrated circuit 22.

An opening 36 may be patterned by lithography and etching processes that penetrates through the back-end-of-line stack 34 to the uppermost dielectric layer of the one or more dielectric layers 24. In an embodiment, an etch stop layer (not shown) may be applied on the optical couplers 30, 32 before the back-end-of-line stack 34 is formed, the etching process forming the opening 36 may stop on the etch stop layer, and the etch stop layer may be removed after the opening 36 is formed. A portion of the opening 36 is laterally disposed between the optical coupler 30 and the optical coupler 32. In an embodiment, the opening 36 may overlap with a portion of the optical coupler 30 and a portion of the optical coupler 32.

Figures 4, 4A:
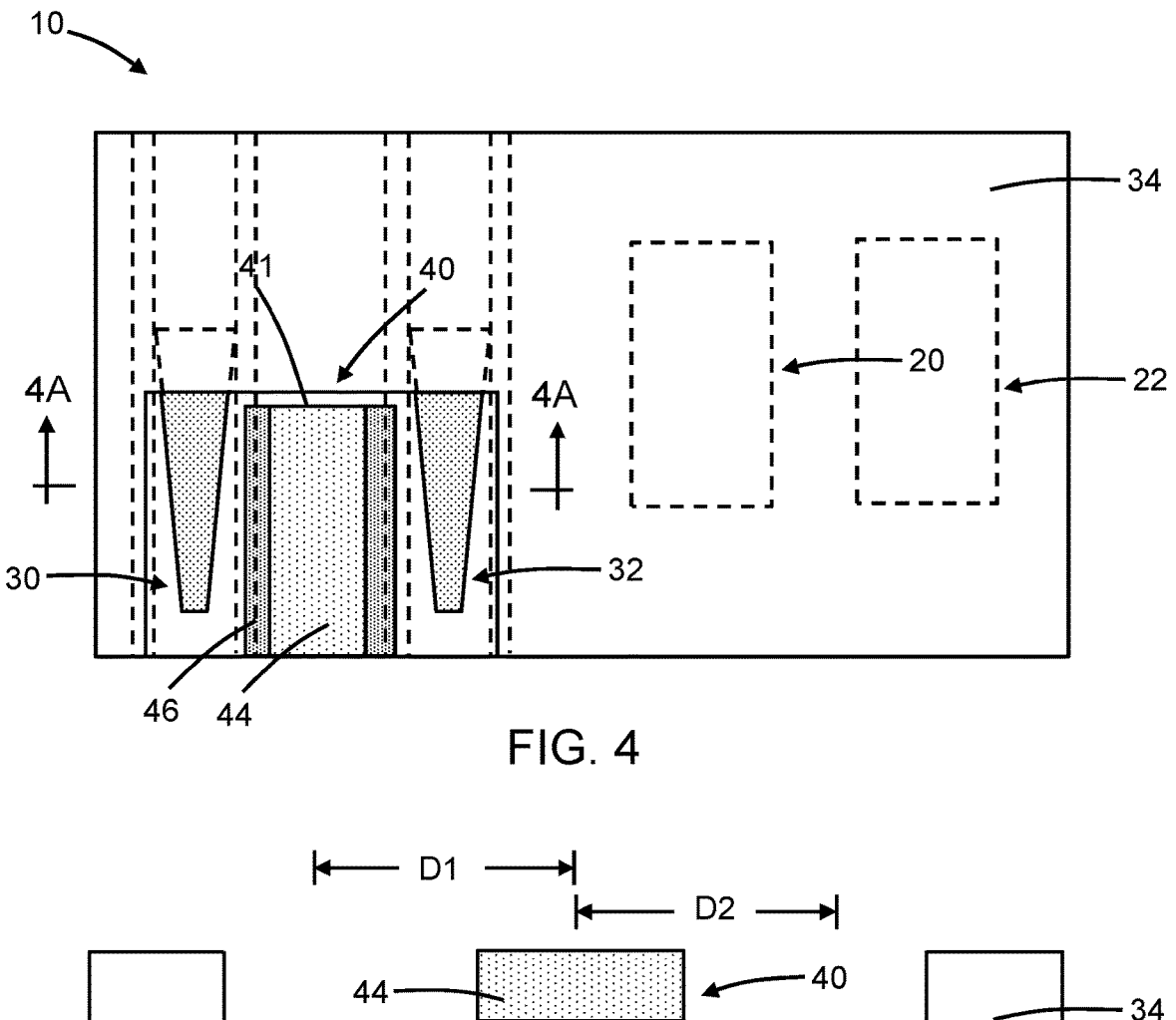
FIG. 4 is a top view of the structure at a fabrication stage of the processing method subsequent to FIG. 3.
FIG. 4A is a cross-sectional view taken generally along line 4A-4A in FIG. 4.

With reference to FIGS. 4, 4A in which like reference numerals refer to like features in FIGS. 3, 3A and at a subsequent fabrication stage, a semiconductor laser 40 including a multi-layer quantum-well stack 42 may be placed inside the opening 36 in the back-end-of-line stack 34 and bonded to the topmost dielectric layer of the one or more dielectric layers 24. A dielectric layer 45 comprised of, for example, silicon dioxide may be utilized to facilitate the bonding. The back-end-of-line stack 34 at the perimeter of the opening 36 surrounds multiple sides of the multi-layer quantum-well stack 42. The opening 36 is dimensioned to provide adequate clearance for placing the semiconductor laser 40 into the opening 36.

In an embodiment, the semiconductor laser 40 may be configured to emit laser light of a given wavelength, intensity, mode shape, and mode size. In an embodiment, the multi-layer quantum-well stack 42 may be comprised of one or more III-V compound semiconductor materials that are arranged in a layer stack, and may be disposed between a layer 44 comprised of a p-type III-V compound semiconductor material and a layer 46 comprised of an n-type III-V compound semiconductor material. In an embodiment, the semiconductor laser 40 may have the form of a prefabricated coupon. In an alternative embodiment, the semiconductor laser 40 may be replaced by a semiconductor optical amplifier that includes the multi-layer quantum-well stack 42. In an alternative embodiment, the semiconductor laser 40 may be a quantum dot laser.

The semiconductor laser 40 includes a portion that is adjacent to the optical couplers 30, 32 and laterally disposed between the optical coupler 30 and the optical coupler 32. The adjacent portion of the semiconductor laser 40 has a terminating end 41 that is located inside the opening 36. In an embodiment, the adjacent portion of the semiconductor laser 40 may be non-tapered. In an embodiment, the optical couplers 30, 32 may be symmetrically positioned relative to the semiconductor laser 40. In an embodiment, the adjacent portion of the semiconductor laser 40 may have a non-overlapping relationship with the optical coupler 30. In an embodiment, the adjacent portion of the semiconductor laser 40 may have a non-overlapping relationship with the optical coupler 32. In an embodiment, the adjacent portion of the semiconductor laser 40 may have a non-overlapping relationship with both optical couplers 30, 32.

The optical coupler 30 is diagonally offset from the adjacent portion of the semiconductor laser 40 and the optical coupler 32 is diagonally offset from the adjacent portion the semiconductor laser 40. The diagonal offset of the optical coupler 30 includes a lateral offset D1 in a lateral direction and a vertical offset D3 in a vertical direction that is transverse to the lateral direction. The diagonal offset of the optical coupler 32 includes a lateral offset D2 in a lateral direction and a vertical offset D4 in a vertical direction that is transverse to the lateral direction. The lateral offsets D1, D2 may be measured between the vertical midplane of the adjacent portion of the semiconductor laser 40 and the vertical midplanes of the optical couplers 30, 32. The vertical offsets D3, D4 may be measured between the horizontal midplane of the adjacent portion of the semiconductor laser 40 and the horizontal midplanes of the optical couplers 30, 32. The vertical offsets D3, D4 reflect the different elevations of the optical couplers 30, 32 and the portion of the semiconductor laser 40 relative to the substrate 18.

Figure 5:
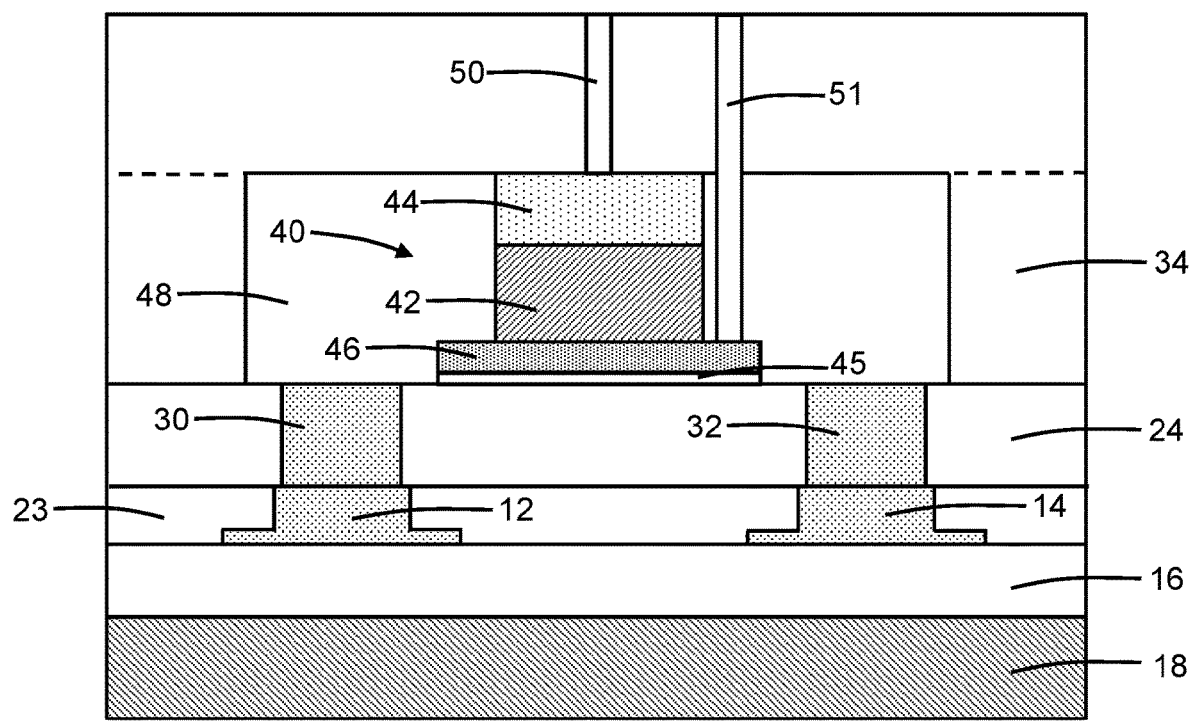
FIG. 5 is a cross-sectional view of the structure at a fabrication stage of the processing method subsequent to FIG. 4.

With reference to FIG. 5 in which like reference numerals refer to like features in FIGS. 4, 4A and at a subsequent fabrication stage, a dielectric layer 48 may be formed that fills the space inside the opening 36 that is unfilled by the semiconductor laser 40. The dielectric layer 48 may be comprised of a dielectric material, such as silicon dioxide, having a refractive index that is less than the refractive index of the III-V compound semiconductor materials constituting the multi-layer quantum-well stack 42 and the layers 44, 46. The dielectric layer 48 may be formed by deposition and planarization. In an embodiment, the height of the semiconductor laser 40 may be reduced by subjecting the layer 44 to a grinding process, before forming the dielectric layer 48, so that the layer 44 is thinned relative to its initial state.

Additional dielectric layers and interconnects of the back-end-of-line stack 34 may be formed after the dielectric layer 48 is formed. In particular, interconnects 50, 51 may be provided that are respectively coupled to the layers 44, 46 of the semiconductor laser 40. The layer 46 may be wider than the multi-layer quantum-well stack 42 and layer 44 to facilitate the coupling of the interconnect 51 to the layer 46.

In use, light generated by the semiconductor laser 40 is transferred diagonally from the semiconductor laser 40 by the optical coupler 30 to the waveguide core 12 and by the optical coupler 32 to the waveguide core 14. For example, the evanescent field of the light generated and emitted by the semiconductor laser 40 may extend to overlap with both optical couplers 30, 32. The light coupling by the optical couplers 30, 32 to the waveguide cores 12, 14 may occur simultaneously such that the mode of the light is split by the optical couplers 30, 32 between the waveguide cores 12, 14.

In an alternative embodiment, the photonics structure 10 may include only the optical coupler 30 or the optical coupler 32. As a result, the adjacent portion of the semiconductor laser 40 is offset in a non-overlapping relationship with either the optical coupler 30 or the optical coupler 32.

The optical couplers 30, 32 enable monolithic integration of the semiconductor laser 40 with the photonic integrated circuit 20 and electronic integrated circuit 22 on the same substrate 18 as part of a heterogenous integration scheme. The heterogenous integration scheme may be achieved at the wafer-level, due to the ability to prefabricate and attach the semiconductor laser 40 that is enabled by the optical couplers 30, 32, without complex die-to-wafer or wafer-to-wafer bonding techniques, and without flip-chip bonding.

Figure 6:
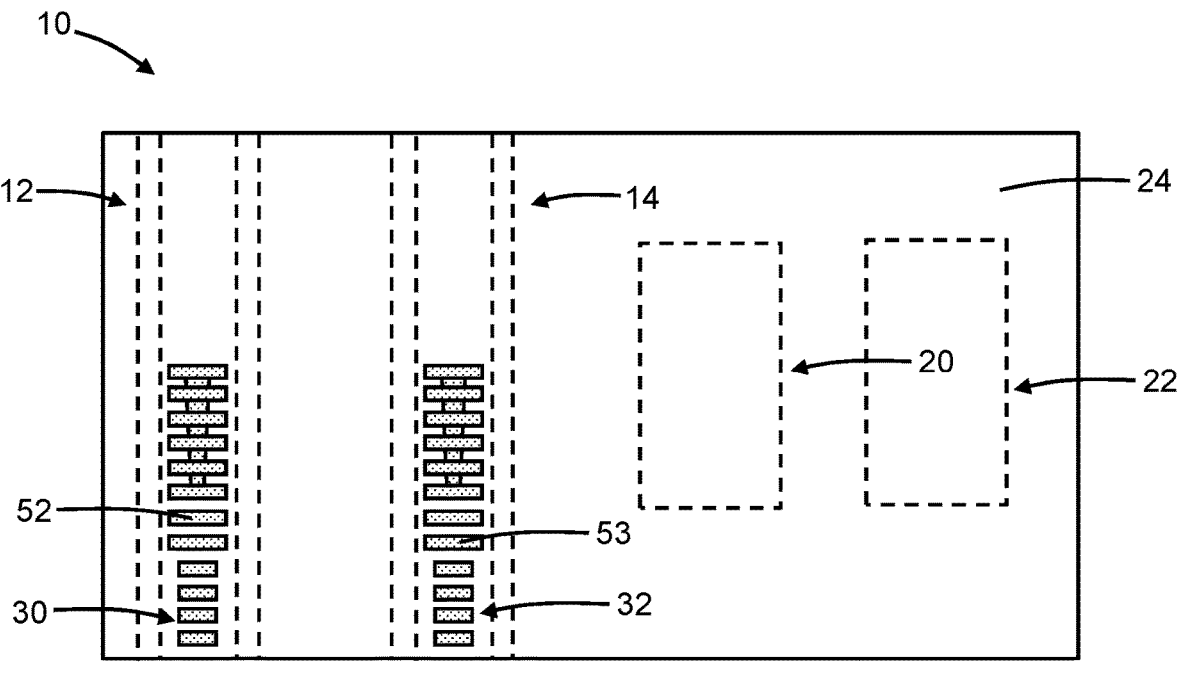
FIG. 6 is a top view of a structure in accordance with alternative embodiments of the invention.

With reference to FIG. 6 and in accordance with alternative embodiments, the optical coupler 30 may include multiple segments 52 that are positioned in a spaced-apart arrangement in which spaces or gaps alternate with the segments 52, and the optical coupler 32 may include multiple segments 53 that are positioned in a spaced-apart arrangement in which spaces or gaps alternate with the segments 53 In an embodiment, the pitch and duty cycle of the segments 52 and/or the segments 53 may be uniform to define a periodic arrangement. In alternative embodiments, the pitch and/or the duty cycle of the segments 52 and/or the segments 53 may be apodized (i.e., non-uniform) to define a non-periodic arrangement. The segments 52 and the segments 53 may be dimensioned and positioned at small enough pitch so as to define a sub-wavelength grating that does not radiate or reflect light at a wavelength of operation, such as a wavelength in a range of 400 nm to 3000 nm. In an alternative embodiment, the ribs overlaid with the segments 52, 53 may be omitted such all of the segments 52 and all of the segments 53 are disconnected from each other.

The gaps between the segments 52 and the gaps between the segments 53 may be filled with dielectric material. For example, the dielectric material of the dielectric layer 48 and the bottommost dielectric layer of the back-end-of-line stack 34 may collectively fill the gaps between the segments 52 and the segments 53. The segments 52 and the portions of the dielectric material inside the gaps may define a metamaterial structure in which the material constituting the segments 52 has a higher refractive index than the dielectric material. The segments 53 and the portions of the dielectric material inside the gaps may define a metamaterial structure in which the material constituting the segments 53 has a higher refractive index than the dielectric material. Each metamaterial structure can be treated as a homogeneous material having an effective refractive index that is intermediate between the refractive index of the material constituting the segments 52, 53 and the refractive index of the dielectric material.

Processing continues as previously described to complete the photonics structure 10.

Figure 7:
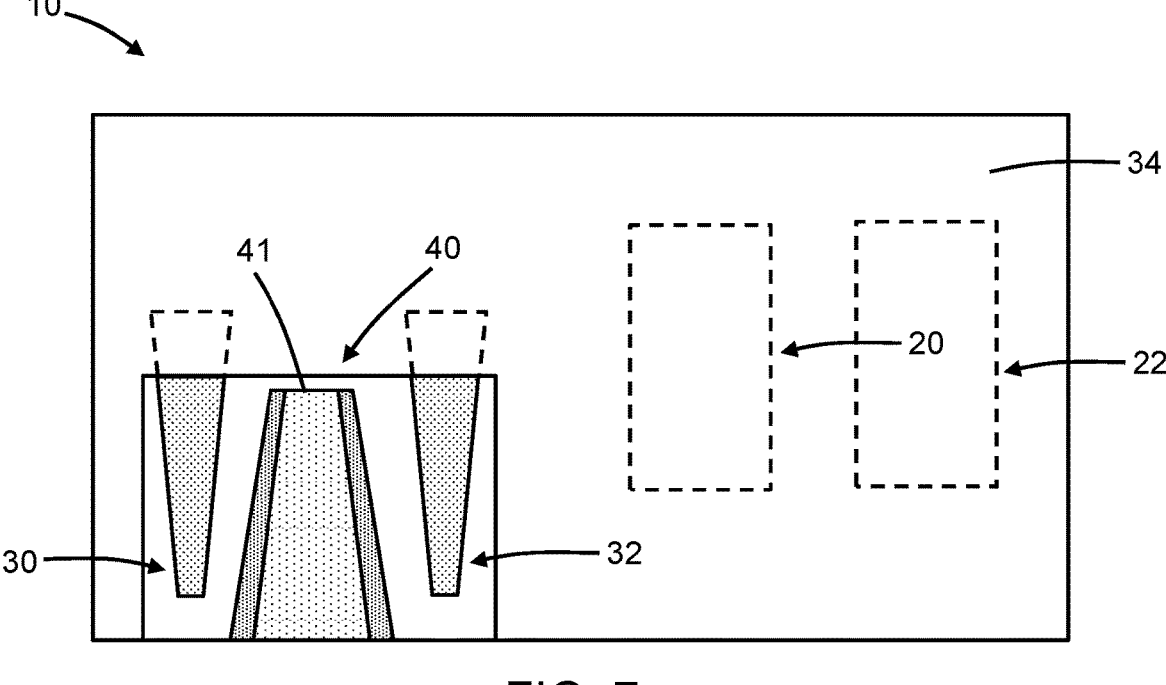
FIG. 7 is a top view of a structure in accordance with alternative embodiments of the invention.

With reference to FIG. 7 and in accordance with alternative embodiments, the portion of the semiconductor laser 40 adjacent to the optical couplers 30, 32 may be tapered in an opposite direction from the tapering of the optical couplers 30, 32. In an embodiment, the portions of the multi-layer quantum-well stack 42, layer 44, and layer 46 included in the tapered portion of the semiconductor laser 40 may all be tapered. In an embodiment, the tapered portion of the semiconductor laser 40 may be lengthwise tapered with a width dimension that increases with increasing distance from a narrowest width at the terminating end 41. In an embodiment, the width dimension of the tapered portion of the semiconductor laser 40 may linearly increase with increasing distance from the terminating end 41. In an alternative embodiment, the width dimension of the tapered portion of the semiconductor laser 40 may change based on a non-linear function, such as a quadratic function, a cubic function, a parabolic function, a sine function, a cosine function, a Bezier function, or an exponential function.

The taper angles of the optical couplers 30, 32 and the taper angle of the portion of the semiconductor laser 40 change in opposite directions because that the portion of the semiconductor laser 40 tapers down with a decreasing width and the optical couplers 30, 32 taper up with an increasing width. In an alternative embodiment, the tapered portion of the semiconductor laser 40 may be disposed between optical couplers 30, 32 that are configured as metamaterial structures (FIG. 6).

Figures 8, 9:
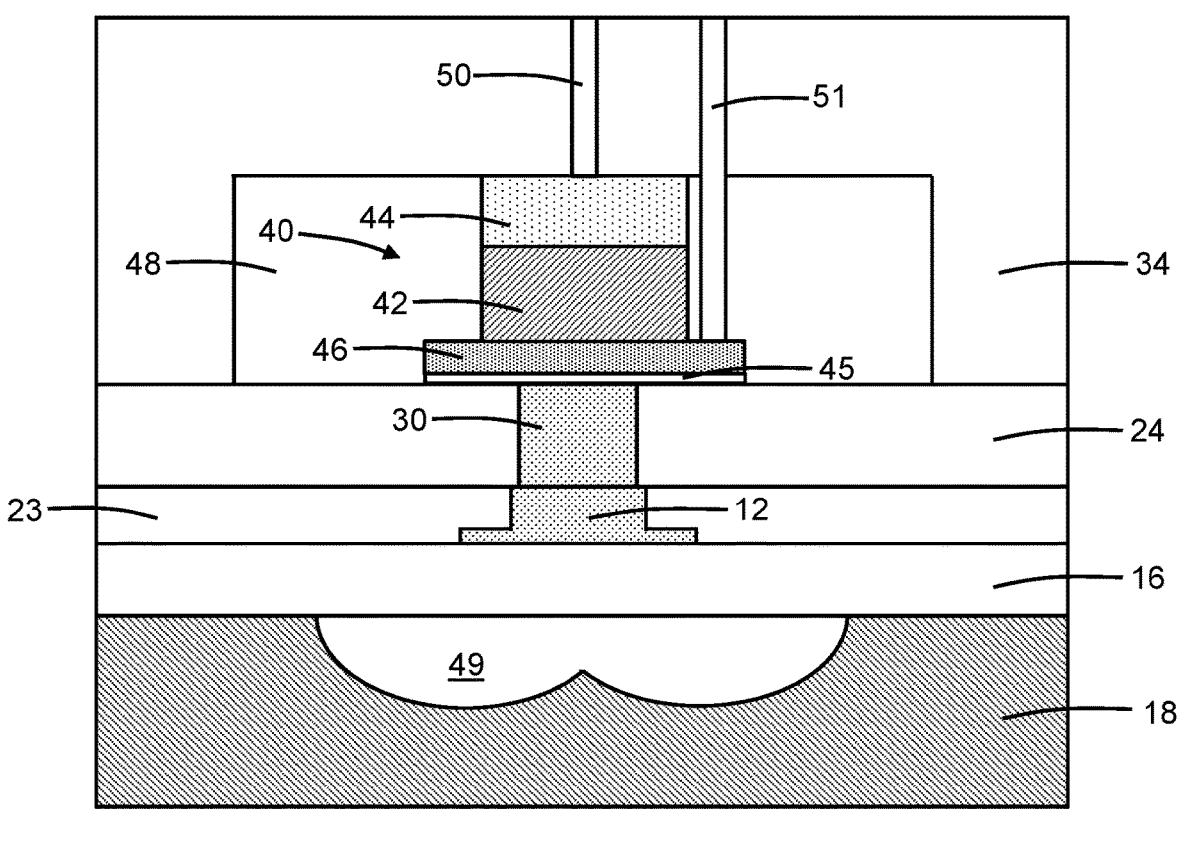
FIG. 8 is a cross-sectional view of a structure in accordance with alternative embodiments of the invention.
FIG. 9 is a cross-sectional view of a structure in accordance with alternative embodiments of the invention.

With reference to FIG. 8 and in accordance with alternative embodiments, the opening 36 and semiconductor laser 40 may be disposed directly over the optical coupler 30 and the waveguide core 12, and the optical coupler 32 and the waveguide core 14 may be omitted from the photonics structure 10. As a result, a portion of the semiconductor laser 40 may overlap with at least a portion of the optical coupler 30. In an embodiment, the portion of the semiconductor laser 40 may fully overlap with the optical coupler 30. During use, light generated by the semiconductor laser 40 is transferred vertically from the semiconductor laser 40 by the optical coupler 30 to the waveguide core 12.

In an embodiment, an undercut 49 may be formed that extends as a cavity in the substrate 18 beneath all or a portion of the optical coupler 30. In an embodiment, the undercut 49 may be centered beneath the optical coupler 30. The undercut 49, which may be sealed, may reduce the leakage loss of light to the substrate 18 during operation.

With reference to FIG. 9 and in accordance with alternative embodiments, the trench 26 may be widened and the optical coupler 30 may be formed with a width that is narrower than the width of the trench 26. In that regard, the semiconductor material, such as amorphous silicon, constituting the optical coupler 30 may be deposited and patterned by lithography and etching processes. Residual portions of the patterned semiconductor material may remain inside the trench 26 as rails 56 that are disposed adjacent to the sidewalls of the trench 26. The open spaces between the optical coupler 30 and the rails 56 may be filled by dielectric material from a dielectric layer 54, which may be deposited and planarized.

Processing continues as previously described to complete the photonics structure 10.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A photonics structure comprising:
   a semiconductor substrate;
   a back-end-of-line stack over the semiconductor substrate, the back-end-of-line stack including an opening;
   a first waveguide core;
   a multi-layer quantum-well stack disposed inside the opening in the back-end-of-line stack; and
   a first optical coupler on a portion of the first waveguide core, the first optical coupler comprising a semiconductor material, and the first optical coupler disposed between the portion of the first waveguide core and the multi-layer quantum-well stack.

2. The photonics structure of claim 1 wherein the multi-layer quantum-well stack has a non-overlapping relationship with the first optical coupler.

3. The photonics structure of claim 1 wherein the first optical coupler is diagonally offset from the multi-layer quantum-well stack.

4. The photonics structure of claim 1 wherein the multi-layer quantum-well stack has an overlapping relationship with the first optical coupler.

5. The photonics structure of claim 1 further comprising:
   a photonic integrated circuit on the semiconductor substrate.

6. The photonics structure of claim 1 further comprising:
   an electronic integrated circuit on the semiconductor substrate.

7. The photonics structure of claim 1 wherein the first optical coupler is lengthwise tapered.

8. The photonics structure of claim 1 wherein the first optical coupler includes a plurality of segments and a dielectric material between the plurality of segments.

9. The photonics structure of claim 1 further comprising:
a second waveguide core; and
a second optical coupler on a portion of the second waveguide core, the second optical coupler comprising the semiconductor material, and the second optical coupler disposed between the portion of the second waveguide core and the multi-layer quantum-well stack.

10. The photonics structure of claim 9 wherein the multi-layer quantum-well stack has a non-overlapping relationship with the first optical coupler, and the multi-layer quantum-well stack has a non-overlapping relationship with the second optical coupler.

11. The photonics structure of claim 9 wherein the first optical coupler and the second optical coupler are diagonally offset from the multi-layer quantum-well stack.

12. The photonics structure of claim 11 wherein the multi-layer quantum-well stack is disposed between the first optical coupler and the second optical coupler.

13. The photonics structure of claim 1 wherein the semiconductor material comprises silicon.

14. The photonics structure of claim 1 wherein the multi-layer quantum-well stack is lengthwise tapered.

15. The photonics structure of claim 1 wherein the multi-layer quantum-well stack comprises one or more III-V compound semiconductor materials that are arranged in a layer stack, and further comprising:

a first layer comprising a p-type III-V compound semiconductor material; and
a second layer comprising an n-type III-V compound semiconductor material,
wherein the multi-layer quantum-well stack is disposed between the first layer and the second layer.

16. The photonics structure of claim 1 wherein the first waveguide core and the first optical coupler are disposed between the semiconductor substrate and the back-end-of-line stack.

17. The photonics structure of claim 16 wherein the first optical coupler is disposed between the first waveguide core and the back-end-of-line stack.

18. The photonics structure of claim 1 wherein the multi-layer quantum-well stack is surrounded by the back-end-of-line stack.

19. The photonics structure of claim 17 wherein the first optical coupler is diagonally offset from the multi-layer quantum-well stack.

20. A method of forming a photonics structure, the method comprising:
forming a back-end-of-line stack over a semiconductor substrate, wherein the back-end-of-line stack includes an opening;
forming a waveguide core;
forming a multi-layer quantum-well stack disposed inside the opening in the back-end-of-line stack; and
forming an optical coupler on a portion of the waveguide core, wherein the optical coupler comprises a semiconductor material, and the optical coupler is disposed between the portion of the waveguide core and the multi-layer quantum-well stack.

* * * * *